United States Patent [19]

Weber et al.

[11] 4,009,243
[45] Feb. 22, 1977

[54] CONTINUOUS PROCESS FOR SCRUBBING OUT HYDROGEN SULFIDE AND AMMONIA FROM COKE OVEN GAS

[75] Inventors: Heinrich Weber; Gustav Choülat; Dieter Laüfhutte, all of Recklinghausen, Germany

[73] Assignee: Firma Carl Still, Germany

[22] Filed: Oct. 25, 1973

[21] Appl. No.: 409,725

Related U.S. Application Data

[63] Continuation-in-part of Ser. No. 195,798, Nov. 4, 1971, abandoned.

[30] Foreign Application Priority Data

Nov. 18, 1970 Germany .......................... 2056727

[52] U.S. Cl. .............................................. 423/234
[51] Int. Cl.² ...................................... B01D 53/34
[58] Field of Search .......... 423/232, 233, 234, 237, 423/238; 55/70, 73

[56] References Cited

UNITED STATES PATENTS

| | | | |
|---|---|---|---|
| 2,106,734 | 2/1938 | Gollmar | 423/238 |
| 2,884,304 | 4/1959 | Grosskinsky et al. | 423/234 |
| 2,899,277 | 8/1959 | Holowaty | 423/238 |
| 3,097,065 | 7/1963 | Gollmar | 423/238 |

*Primary Examiner*—Earl C. Thomas
*Attorney, Agent, or Firm*—McGlew and Tuttle

[57] ABSTRACT

A continuous process is provided for scrubbing hydrogen sulfide and ammonia from coke oven gases by selectively scrubbing the hydrogen sulfide using aqueous ammonia, then distilling the hydrogen sulfide again from the wash liquor combining the ammonia directly with acids or certain acid salts, e.g., sulfuric acid or ammonium bisulfate, liberating the combined ammonia therefrom by decomposition, and then recycling the released ammonia to the hydrogen sulfide scrubber, thereby increasing the ratio of ammonia to hydrogen sulfide therein. A preferred absorbent for ammonia is monoammonium phosphate.

9 Claims, 2 Drawing Figures

CONTINUOUS PROCESS FOR SCRUBBING OUT HYDROGEN SULFIDE AND AMMONIA FROM COKE OVEN GAS

CROSS-REFERENCE TO PRIOR APPLICATION

This application is a continuation-in-part of copending Application Ser. No. 195,798, filed on Nov. 4, 1971, now abandoned.

BACKGROUND AND PRIOR ART

Continuous methods for scrubbing out hydrogen sulfide and ammonia from coke oven gas are known. The ammonia is scrubbed in the ammonia scrubber which is operated with water and arranged behind the hydrogen sulfide scrubber which is operated with aqueous ammonia and the ammonia is distilled in a distilling apparatus as gaseous vapors with a very low content of acid constituents. The ammonia is added to the upper part of the hydrogen sulfide scrubber in order to increase the ammonia concentration at this point, at which the gas entering the scrubber from the bottom has only a low content of hydrogen sulfide, with respect to the ammonia concentration. The reason for this is that this permits combining the hydrogen sulfide more extensively and more selectively with ammonia and removal of hydrogen sulfide from the gas. Such an increase of the ammonia concentration in the upper part of the scrubber is particularly desirable because the ammonia wash water circulating between the scrubber and the deacidifier is liberated in the deacidifier only up to 60 to 70% of acid constituents, particularly of hydrogen sulfide and carbon dioxide. The remaining portions return in a cycle to the scrubber and the ammonia combined with them is not available for scrubbing the hydrogen sulfide out of the gas. Only the content of free ammonia in the wash water is determinant for the removal of hydrogen sulfide. Without returning the gaseous ammonia vapors of the distilling apparatus to the scrubber, only about 80% of the hydrogen sulfide can be removed from the coke oven gas, while when the gaseous ammonia vapors of the distilling apparatus are fed to the scrubber, over 98% are scrubbed out so that a residual content of the order of 0.1 to 0.2 g $H_2S/m^{3n}$ remains therein.

From the foregoing considerations, it follows that the ammonia vapors fed to the hydrogen sulfide scrubber must themselves be very pure and possibly free of acid moieties like hydrogen sulfide and carbon dioxide as well as hydrocyanic acid. This is achieved by subjecting the ammonia wash water which frequently also contains coal water, to a particularly careful distillation in the ammonia still, conducting the vapors containing hydrogen sulfide, hydrogen cyanide and carbon dioxide into the deacidifier for the ammoniacal hydrogen sulfide wash water operated in combination with the ammonia still. The ammonia still, which is designed as a distillation column, is increased for the same purpose by several rectifying bottoms and equipped with additional cooling cycles. This method is expensive both in itself and as far as equipment is concerned. The method would be much more perfect if it were possible in a simpler manner to provide even purer ammonia vapors for introduction into the upper part of the hydrogen sulfide scrubber. Such a method is the basis of the present invention.

SUMMARY OF THE INVENTION

The present invention concerns a circulation method for scrubbing out hydrogen sulfide and ammonia from coke oven gases where the hydrogen sulfide is scrubbed out to a great extent selectively by aqueous or aqueous and gaseous ammonia and then distilled from the wash waters, and the ammonia of the coke oven gas is combined directly with acids whose ammonium salts can be dissociated into ammonia and acid salts or with such acid salts during their complete or partial neutralization and the ammonia is then released therefrom by decomposition, which method comprises adding the released ammonia to the hydrogren sulfide scrubber in order to increase the $NH_3/H_2S$ ratio.

The ammonia released in this way is characterized by high purity, since the acid accompanying substances of ammonia in the coke oven gas, like hydrogen sulfide, hydrogen cyanide and carbon dioxide, are absorbed by the solutions of the acid absorbents in a negligibly low concentration.

For the absorption of the ammonia, the following is useful: sulfuric acid, mostly in diluted form, or an aqueous solution or suspension of ammonium bisulfate. Ammonium bisulfate is neutralized to ammonium sulfate and separated in solid form, washed, dried and dissociated thermally into ammonia and ammonium bisulfate, for example, according to British Patent No. 829,859. The ammonia obtained is contaminated only by traces of sulfur dioxide, methane, nitrogen and air, and it is fed according to the invention to the upper part of the hydrogen sulfide scrubber and there increases the ammonia concentration. After its comminution, the ammonium bisulfate is dissolved again or suspended in the solution from which it was separated and the solution is used again for the absorption of ammonia.

According to U.S. Pat. Nos. 3,024,089 and 3,186,795, the ammonia is preferably absorbed from the gas with an aqueous solution or suspension of mono-ammonium-phosphate. The mono-ammonium-phosphate is neutralized to di-ammonium phosphate. From the di-ammonium phosphate solution, the ammonia is distilled with steam and mono-ammonium-phosphate is formed again from di-ammonium phosphate. The mono-ammonium-phosphate solution is again used for the absorption of ammonia from the coke oven gas. The ammonia vapors obtained contain only traces of acid constituents and they are added according to the invention to the upper part of the hydrogen sulfide scrubber.

In one embodiment of the invention, the entire combined and released ammonia or the entire ammonia vapors obtained are fed to the hydrogen sulfide scrubber or only a part thereof. In a further embodiment, the portion of ammonia not used in the scrubber is used in any desired manner, or the ammonia is burnt or decomposed and the decomposition gas is added to any combustion gases to make them lean.

In another embodiment of the invention, the ammonia is transformed completely, or partly, into an aqueous solution or the vapors are condensed completely, or partly, and the aqueous ammonia is fed to the hydrogen sulfide scrubber. A part of the ammonia is thus added to the scrubber in gaseous form and the other part in liquid form. The gaseous and the liquid ammonia are added in the upper to central part of the scrubber.

The ammoniacal wash waters which are obtained, and which run off from the hydrogen sulfide scrubber, are so worked up in the deacidifier column, and in the ammonia distilling column operated in connection with it, that vapors are obtained from the deacidifier column which contain the entire hydrogen sulfide scrubbed out and the entire ammonia is absorbed and released again. These vapors are worked up according to the invention to sulfuric acid or sulfur, for example, by burning the ammonia and using its heat of combustion for the production of steam.

The ammonia scrubber is also operated in conventional manner in combination with the deacidifier so that the hydrogen sulfide and the ammonia are obtained separately.

The separation of $H_2S$ and $NH_3$ during the operation of the plant can also be effected that the entire hydrogen sulfide is obtained at the head of the deacidifier column and a part of the ammonia scrubbed out from the gas is removed from the decomposition apparatus of the ammonia binder and only the residual ammonia is introduced into the hydrogen sulfide scrubber.

In these cases, the conversion of hydrogen sulfide to sulfuric acid is effected according to the known wet catalysis method and the conversion to sulfur is carried out according to the known Claus method.

According to likewise known methods, the ammonia is burnt or decomposed by itself, as it is described, for example, in German Patent Nos. 1,202,772 and 1,200,268, or the ammonia can be used in the air heaters of blast furnaces or as components for the generation of gas in gas generators or gas producing plants.

If the coke oven gas does not have to be desulfurized to such a great extent, that is, if a desulfurization of 80%, for example, is sufficient, the above-described continuous process is also used economically. In this case, the deacidifying column can be substantially simplified.

For an understanding of the principles of the invention, reference is made to the following description of typical embodiments thereof as illustrated in the accompanying drawings.

In this specification, the terms "coal water" and "phosam-solution" have the following meanings. "Coal water" means the water which is chemically produced during distillation or coking of coal, and which is condensed, along with moisture during the cooling of the distillation gas or coke gas, and which contains ammonia. The term "phosam-solution" means an aqueous solution of mono-ammonium dihydrogen phosphate.

The invention will be described more fully with reference to the drawings and the following examples in which the process of the invention is described. The examples are submitted and described herein merely to illustrate the invention without intending any limitation thereto.

In this specification and examples, the following terms have meanings as follows:

g = grams(s)
$m^3$ = cubic meters
m = meter(s)
h = hours(s)
$m^3n$ = cubic meters at 760mm Hg; and 0 degree C.
C = Centigrade
deg = degree(s)
kg = kilogram(s)

GENERAL DESCRIPTION OF SPECIFIC EMBODIMENTS

Figure 1:
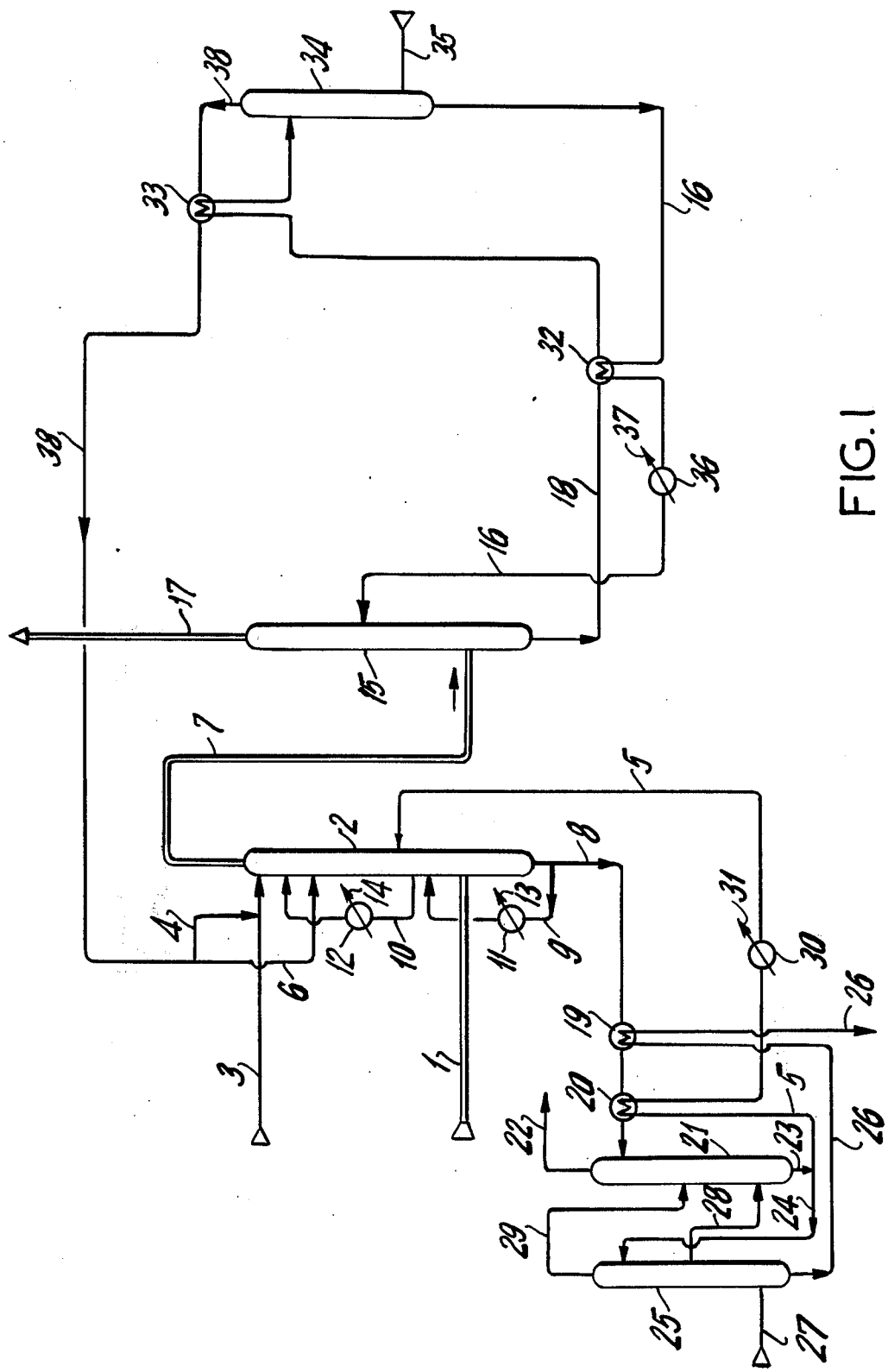
FIG. 1 is a flow chart or process scheme illustrating one embodiment of the invention.

Referring now to the process flow chart in FIG. 1, 70,000 $m^3n$/h crude coke oven gas of 30° C with 525 kg/h $NH_3$, 560 kg/h $H_2S$ and 2,800 kg/h $CO_2$ arrive through line 1 in the sump of the $H_2S$ scrubber 2.

In addition, 25 $m^3$ of so-called coal water at 30° C with 35 kg/h free $NH_3$, 5 kg/h $H_2S$ and 15 kg/h $CO_2$, to which 65 kg/h $NH_3$ in liquid form are added through line 4, are added through line 3 and 55 $m^3$ n/h deacidified circulating water with 1230 kg/h $NH_3$, 165 kg/h $H_2S$ and 240 kg/h $CO_2$ are added through line 5. Furthermore, 355 kg/h $NH_3$ are added through line 6 to the head or the upper part of the $H_2S$ scrubber 2.

The desulfurized coke oven gas issues at the head of the $H_2S$ scrubber 2 through line 7 with 423 kg/h $NH_3$, 7 kg/h $H_2S$ and 2,200 kg/h $CO_2$.

Two cooling cycles are provided to eliminate the heat of reaction. Wash water is removed through lines 9 to 10 and introduced again, and cooled in the coolers 11 and 12 by means of cooling water from lines 13 and 14.

For scrubbing out the $NH_3$ still contained in the coke oven gas, the latter is conducted through line 7 to the $NH_3$ scrubber 15.

To the head of the $NH_3$ scrubber 15 are fed 3000 kg of a mixture of mono- and di-ammonium phosphate in 40% aqueous solution through line 16. The temperature in the scrubber 15 is 50° C. The ratio, by weight of mono- to di-ammonium phosphate in this solution is 1.4.

At the head of the $NH_3$ scrubber the purified coke oven gas issues with 3 kg/h $NH_3$, 7 kg/h $H_2S$ and 2,250 kg/h $CO_2$ through line 17.

The phosphate solution enriched with $NH_3$ is removed from the sump of the $NH_3$ scrubber through line 18.

The enriched $NH_3$ circulating water removed from the sump of the $H_2S$ scrubber through line 8 flows over the heat exchanger 19 and 20 at 80° C into the deacidifying column 21 which is operated at about atmospheric pressure.

At the head of the deacidifying column 21 is obtained the entire scrubbed amount of $NH_3$, $H_2S$ and $CO_2$, namely, 557 kg/h $NH_3$, 558 kg/h $H_2S$ and 615 kg/h $CO_2$, and flows through line 22 to $H_2SO_4$ plant.

The deacidified water is removed from the sump of the deacidifying column 21 through line 23. A partial current corresponding to the amount of coal water of 25 $m^3$/h flows through line 24 to the distilling column 25 where it is liberated to a great extent of $NH_3$, $H_2S$ and $CO_2$. The waste water flows at 85° C through line 26 to the heat exchanger 19 and subsequently to the waste water flue. The distilling column 25 is heated with $H_2O$ vapor which is added through line 27. The $NH_3$, $H_2S$, $CO_2$ and $H_2O$ vapors released in the distilling column 25 are used for heating the deacidifying column 21 through lines 28 and 29 leading to the deacidifying column 21.

The deacidified circulating water arrives through line 5 over heat exchanger 20 and cooler 30 in the $H_2S$ scrubber 2. Cooler 30 is charged with cooling water through line 31.

The phosphate solution removed from the sump of NH₃ scrubber 15 flows for regeneration through line 18 over heat exchanger 32 and partial condenser 33 to the regenerating column 34 which is heated with H₂O vapor through line 35. In the sump, the regenerated solution is fed through line 16 over heat exchanger 32 and cooler 36 to the H₂S scrubber 15 and conducted to column 34 by line 18 via heat exchangers 32 and 33. Cooler 36 is charged with cooling water through line 37.

At the head of regenerating column 34, the entire NH₃ scrubbed out in the NH₃ scrubber 15 flows through line 38 at 100° C into the partial condenser 33 and back to the H₂S scrubber 2 where the liquid portion is added through line 4 to the cool water in line 3 and the gaseous portion through line 6 directly to the H₂S scrubber 2.

In another example, the head vapor line 29 of the distilling column 21 is not conducted back to the deacidifier 21, and the ammonia vapors are obtained through it and through the head vapor line 22 of the deacidifier 21, the hydrogen sulfide vapors are obtained.

In still another example, by increasing the NH₃ scrubbing 15 by means of circulating ammonium phosphate solution, the entire amount of NH₃ contained in the coke oven gas is removed from the deacidifying column 21 through line 22. Only the excess amounts of circulating ammonia vapors are then returned to the H₂S scrubber 2 through line 28.

In a further embodiment of the invention, the process of the present invention is used in achieving good desulfurization selectively. Decisive for such a selective and good desulfurization is not the purity of the ammonia added so the H₂S scrubber, but the excess of free ammonia in connection with the duration of contact (time of dwell).

The process of the invention described in the first example herein is based upon a desulfurization process carried out by means of an ammonia-water-circulating scrubbing, ammonia scrubbing by means of the so-called Phosam-solution (Phosam installation), and the treatment of the H₂S to sulfur, or sulfuric acid in connection with the NH₃ decomposition or combustion.

In this manner, the pure ammonia obtained in the so-called Phosam installation, is utilized to achieve an improved selective desulfurization before it is decomposed or burnt. It is important here to see that the ammonia scrubbed out in the Phosam-installation is decomposed or burnt. The economic effect, however, is that this portion of the ammonia (before being decomposed or burnt) serves for desulfurization purposes also. If by contrast, the ammonia shall be recovered in the Phosam-installation as anhydrous ammonia, then on the basis of a necessary intermediate degasification of the Phosam-solution, a sufficient amount of ammonia is obtained, and this can be used for selective desulfurization without additional costs.

Furthermore, it has been observed that pure ammonia which leaves the regenerating column 34 through line 38 (see FIG. 1), must be supplied to the H₂S scrubber 2 in order to achieve a good desulfurization of the coke oven gas, (for example 98%). However, for recovering anhydrous ammonia, that is, an ammonia in which impurities such as H₂, CO, CO₂, CO₄ and H₂O can be found only in traces, the phosphate solution enriched with ammonia from the NH₃ scrubber 15 must be degassed before entering the regenerating column 34, so that the acid components which are absorbed to a small extent beside ammonia, such as H₂S, HCN and CO₂, are expelled from the phosphate solution. If this degassing does not take place, the preparation of anhydrous ammonia is rendered substantially more difficult (increased reflux in the regenerating column 34, increased alkali consumption, etc.).

The gases obtained in this degassing now contain beside the main amount of H₂S, HCN and CO₂, also much ammonia, and it has been found that, instead of pure ammonia from the regenerating column 34, these impure degassing gases can be sent back to the H₂S scrubber 2. If no desulfurization is connected with the NH₃ scrubbing, then these gases have to be conducted back into the crude gas so that no ammonia losses occur. Thus there results a higher loading of the NH₃ scrubber by the circulated gases and a larger sized scrubber must be used, namely for a larger gas throughput.

Figure 2:
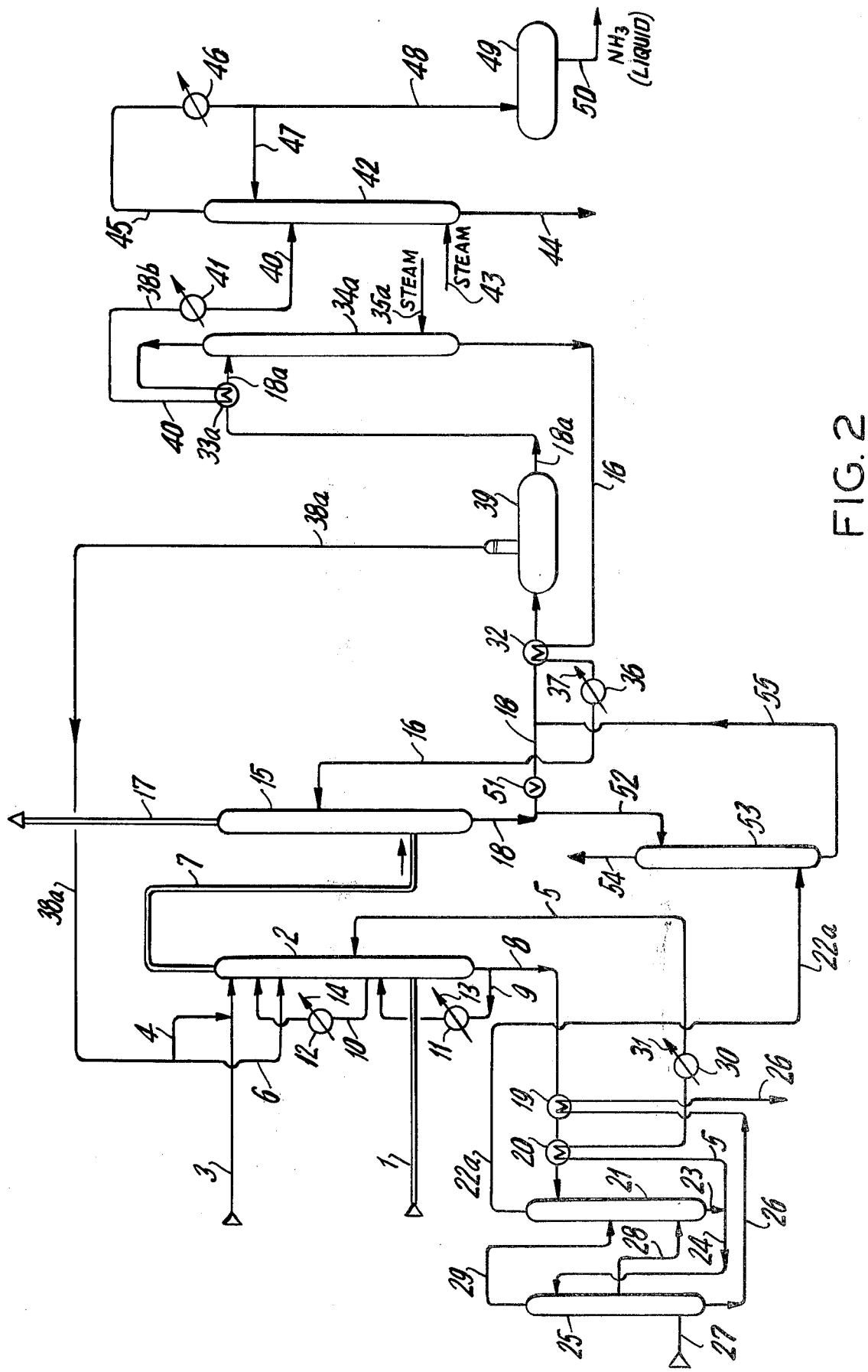
FIG. 2 is a similar chart showing another embodiment of the invention.

This alternate process variant according to the invention is described hereinbelow with reference to FIG. 2 of the drawings.

The phosphate solution enriched from the sump of the NH₃ scrubber 15 with NH₃ and which also contains H₂S, HCN and CO₂ is removed through line 18 and enters over the heat exchanger 32 into a degassing vessel 39. Here, the phosphate solution releases a portion of the ammonia, and the major portion of the absorbed impurities H₂S, HCN and CO₂. In the example given, (70,000 Nm³ crude gas per hour), about 250 kg NH₃ in the degassing gas are obtained at a temperature of about 100° C and this gas has the following composition:

NH₃: 5 – 10 weight %
H₂O: 89 – 94 weight %
H₂S: about 0.5 weight %
CO₂: about 0.5 weight %
Traces of HCN, CO, H₂, etc.

This degassing gas is sent back through line 38a to the H₂S scrubber; the condensed portions through lines 4 and 3, and the gaseous components through line 6. It has been established that the introduction of acid impurities with the ammonia does not unfavorably influence the scrubbing out of the H₂S from the crude gas. A 98% scrubbing is achieved here and an ammonia is obtained which meets the requirements for liquifying.

The degassed phosphate solution from the degassing tank 39 arrives through line 18a and partial condenser 33a into regenerating column 34a which is heated with steam through line 35a. Pure ammoniacal damp vapors which contain over 98% of the ammonia scrubbed out from the coke oven gas flow through line 38a', partial condenser 33a, line 40 and cooler 41 into the rectifying column 42 which is supplied with heating steam through line 43. From there, a waste water flows off through line 44, which contains NH₃ and other impurities only in traces, while over the head through line 45, vapors with an ammonia content of 99.99% are delivered. These are cooled in condenser 46 and the condensed portions are again partly supplied as reflux to the rectifying column 42 through line 47. Anhydrous ammonia, which can be completely compressed to liquid, is delivered through line 48 and stored in tank 49. It is discharged from tank 49 through line 50.

A suitable further development of this method in the event that a small ammonia content sets up in the gas after the H₂S scrubber (before about 6 gm NH₃/Nm³, afterwards about 3 gm. NH₃/Nm³) consists in that the NH₃ scrubbing with phosphate solution is carried out in two steps. Step I: after the H₂S scrubber; and Step II: after the deacidifier in the vapors current. This is, therefore, particularly advantageous because in this way also the portion of ammonia which is in the coal water and partly gets directly to the distillation can be recovered as anhydrous ammonia. The ammonia losses in this arrangement are smaller than 2%.

Due to the small ammonia content of the crude gas, only a small NH₃ scrubber 15 is necessary. In addition, the vapors leaving the deacidifier through line 22 also contain ammonia and, in this case, now have the following composition:

300 – 450 kg/h NH₃ 558 kg/h H₂S 615 kg/h CO₂
besides some HCN, aromatics, etc.
Pressure: about 1.2 atm. abs.
Temperature: 84°–86° C The damp vapors are saturated with water vapor. The damp vapors have a volume of about 3,000 Nm³/h. In order to recover the ammonia at a great concentration from this small quantity of damp vapors, it is also sufficient to have a very small NH₃ scrubber and it appeared that this second NH₃ scrubber can be installed suitably and advantageously as second step after the crude gas NH₃ scrubber 15.

This method also has the advantage that it requires only two small NH₃ scrubbers and, in this way, the plant costs can be diminished. The new method is represented by FIG. 2. Fluid in line 18 leaving scrubber 15 is separated when valve 51 is closed and the enriched phosphate solution from the NH₃ scrubber 15, which represents the first step, is introduced into the second scrubbing step 53 through line 52. In counter-current with the phosphate solution, through line 22a, the damp vapors flow from deacidifier 21 containing ammonia and hydrogen sulfide. The ammonia is absorbed by the phosphate solution and the scrubbed damp vapors leave through line 54 and are supplied to a sulfur or sulfuric acid plant. The composition of the vapors is as follows:

kg/h NH₃: 9
kg/h H₂S: 558
kg/h CO₂: 615
besides some HCN, aromatics, etc.
Pressure about 1.1 atm. abs.
Temperature: 98° to 99° C The damp vapors are saturated with water vapor.

The phosphate solution further enriched with ammonia in the second scrubbing step 53 is withdrawn through line 55 and again introduced into line 18 after the valve 51.

While specific embodiments of the invention have been shown and described in detail to illustrate the application of the principles of the invention, it will be understood that the invention may be embodied otherwise without departing from such principles.

What is claimed is:

1. In a process for removing hydrogen sulfide and ammonia from coke-oven gas by scrubbing in a scrubber, wherein the hydrogen sulfide is removed with aqueous ammonia while also using gaseous ammonia, the source of both the aqueous and gaseous ammonia being said coke-oven gas, and wherein the hydrogen sulfide is subsequently separated by distillation from the aqueous ammonia enriched with hydrogen sulfide and thereafter the lean aqueous ammonia recycled to said scrubber, and thereupon, the ammonia in excess contained in the coke-oven gas and not needed for the scrubbing is absorbed by aqueous mono-ammonium phosphate while forming di-ammonium phosphate and ammonia is separated from the ammonia-enriched aqueous ammonium phosphate by distillation, after a preliminary degassing and formation of ammonia-containing degassing gases as well as recovery of mono-ammonium phosphate, and processed to pure ammonia, the improvement wherein ammonia-containing degassing gases are introduced into said scrubber and said gases are used as gaseous ammonia in the scrubbing of hydrogen sulfide from the coke-oven gas, the ammonia in excess contained in the coke-oven gas is partly scrubbed out along with the hydrogen sulfide and conducted, together with the hydrogen sulfide, into a deacidifier for being distilled, and the rest of the ammonia is scrubbed out with aqueous mono-ammonium phosphate whereupon the aqueous ammonium phosphate strips the ammonia from the coke-oven gas and distillation vapors in scrubbers arranged in series, and the degassing gases contain 5 to 10% by weight of ammonia, a total of 2% by weight of hydrogen sulfide, carbon dioxide, hydrogen cyanide, carbon monoxide and hydrogen, as well as 88 to 93% by weight of water vapor.

2. In a continuous process for removal of hydrogen sulfide and ammonia from coke oven gases including: in a first step, scrubbing said coke oven gases to remove the ammonia with water and thus produce aqueous ammonia and in a second step, scrubbing the hydrogen sulfide substantially selectively by aqueous ammonia, or a mixture of aqueous and gaseous ammonia in a hydrogen sulfide scrubber, the improvement which comprises distilling said hydrogen sulfide from the ammoniacal wash waters of the hydrogen sulfide scrubber, the re-cycling the so-regenerated aqueous ammonia from said waters to said second step; absorbing the ammonia contained in the coke oven gas with sulfuric acid or a solution or suspension of ammonium bisulfate for absorbing the ammonia from the coke oven gas; liberating and recovering substantially pure ammonia therefrom by thermal decomposition; and adding the so-liberated substantially pure ammonia to the hydrogen sulfide scrubber and thereby increasing the ratio of ammonia to hydrogen sulfide therein.

3. The improved process according to claim 2, wherein the ammonia is combined with a solution or suspension of mono-ammonium-phosphate for absorbing the ammonia from the coke oven gas instead of with sulfuric acid or a solution or suspension of ammonium bisulfate.

4. The process according to claim 2, wherein only a part of the released ammonia is returned to the hydrogen sulfide scrubber.

5. The process according to claim 2, wherein the ammonia in said first step is transformed partly or completely into aqueous solution, or the ammonia vapors are partly or completely condensed, and the aqueous ammonia and gaseous ammonia vapors are fed to the hydrogen sulfide scrubber.

6. The process according to claim 4, wherein the ammonia is fed to the hydrogen sulfide scrubber in liquid form and in gaseous form in the upper to central part thereof.

7. The process according to claim 2, wherein the ammoniacal wash waters of the hydrogen sulfide scrubber are obtained in a deacidifying column and in an ammonia distilling column operated in connection with said deacidifying column that vapors are obtained at the deacidified head, said vapors containing the entire scrubbed ammonia and the entire scrubbed hydrogen sulfide.

8. The process according to claim 2, wherein the ammoniacal wash waters are withdrawn from a deacidifying column and a distilling column is operated in connection with said deacidifying column and the scrubbed hydrogen sulfide and the scrubbed ammonia are obtained separately from said distilling column.

9. The process according to claim 2, wherein the ammoniacal wash waters of the hydrogen sulfide scrubber are withdrawn from a deacidifying column that vapors are obtained at the deacidifier head which contain the entire amount of hydrogen sulfide scrubbed out, while a part of the ammonia scrubbed out from the gas is removed from the ammonia decomposition apparatus and only the residual ammonia is introduced into the hydrogen sulfide scrubber.

* * * * *